United States Patent
Ham

(10) Patent No.: US 7,366,494 B1
(45) Date of Patent: Apr. 29, 2008

(54) BILLING METHOD IN ELECTRONIC SWITCH IN A CELLULAR NETWORK

(75) Inventor: Seok-Jin Ham, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 09/366,299

(22) Filed: Aug. 2, 1999

(30) Foreign Application Priority Data

Aug. 1, 1998 (KR) .............................. 1998-31441

(51) Int. Cl.
*H04M 11/00* (2006.01)
(52) U.S. Cl. ...................................... 455/406; 455/405
(58) Field of Classification Search ........... 379/114.01, 379/114.02, 114.03, 114.04, 91.01, 59, 112, 379/114; 455/406, 407, 408, 409, 214; 705/34, 705/40
See application file for complete search history.

(56) References Cited

U.S. PATENT DOCUMENTS

| | | | |
|---|---|---|---|
| 5,063,591 A | | 11/1991 | Jodoin |
| 5,233,642 A | * | 8/1993 | Renton ........................ 455/405 |
| 5,325,290 A | * | 6/1994 | Cauffman et al. .......... 364/401 |
| 5,517,555 A | | 5/1996 | Amadon et al. |
| 5,631,947 A | * | 5/1997 | Wittstein et al. ....... 379/114.17 |
| 5,710,807 A | * | 1/1998 | Smith ..................... 379/114.01 |
| 5,742,667 A | * | 4/1998 | Smith ......................... 375/112 |
| 5,805,991 A | * | 9/1998 | Foladare et al. ............. 455/406 |
| 5,898,763 A | * | 4/1999 | Azuma et al. .......... 370/100.04 |
| 5,923,741 A | * | 7/1999 | Wright et al. ................ 379/114 |
| 5,960,070 A | * | 9/1999 | O'Donovan ................. 379/114 |
| 6,094,644 A | * | 7/2000 | Hillson et al. ............... 705/400 |
| 6,263,056 B1 | * | 7/2001 | Gruchala et al. ........... 379/114 |
| 6,338,046 B1 | * | 1/2002 | Saari et al. .................... 705/34 |
| 6,381,455 B1 | * | 4/2002 | Smolik ....................... 455/421 |

FOREIGN PATENT DOCUMENTS

| | | |
|---|---|---|
| CA | 2246844 | 3/1999 |
| CN | 1108851 A | 9/1995 |
| EP | 0 483 091 A | 4/2002 |
| GB | 2290922 | 1/1996 |

OTHER PUBLICATIONS

Chinese Office Action dated Aug. 22, 2003 issued in a counterpart application, namely, Appln. No. 99801258.0.
Canadian Office Action dated Dec. 3, 2002, issued in a counterpart application, namely Appln. No. 2,303,350.

* cited by examiner

*Primary Examiner*—Tu Nguyen
(74) *Attorney, Agent, or Firm*—The Farrell Law Firm, PC

(57) ABSTRACT

A billing method in an electronic switch in a cellular network. A call processor calculates the time period for which service is temporarily interrupted to include only a normal service time period in billing data, and sends the billing data to a billing processor. Therefore, a subscriber is more reasonably billed.

24 Claims, 7 Drawing Sheets

BILLING METHOD IN ELECTRONIC SWITCH IN A CELLULAR NETWORK

BACKGROUND OF THE INVENTION

1. Field of the Invention

The present invention relates generally to a billing method in an electronic switch in a cellular network, and more particularly, to a method of billing service provided in a cellular network based on the actual time normal service is provided without interruptions.

2. Description of the Related Art

An electronic switch manages billing data for each subscriber in order to charge the subscriber for services provided to the subscriber. Billing in the electronic switch is calculated in two ways, namely, how long a line is occupied and how much data is communicated.

The former scheme is generally employed when billing using an electronic switch. In order to bill a service based on the time period provided called the service provided time period, the difference between a service start time and a service end time is calculated.

Billing in the electronic switch is a procedure of generating billing data at every call termination in a call processing block; temporarily storing and processing the billing data in a billing block; and storing the processed billing data on a billing magnetic tape or sending it to a CAMA (Centralized Automatic Message Account).

The call processing block has processing elements corresponding to call types for controlling the entire call processing and is interlocked with other blocks through a library block to facilitate implementation of inter-block operations. Basic call processing, billing, statistics, and data about operating and maintenance are defined with data representing the time periods associated with service states and other information are stored in the library block.

FIG. 1 illustrates a conventional billing procedure in which a service initiation time and a service termination time are stored and then a signal is generated for issuing a billing ticket.

First, a call processor typically an ASP (attached support processor), determines whether call has been initiated in step 111. The call initiation corresponds to a call termination request when a network calls a specific subscriber and a call origination request with which an internal subscriber calls another internal subscriber or an external subscriber through a network. Upon call initiation, the procedure continues at step 113, in which the ASP initializes a data base, which includes initialization of a service start time (st_sec and st_msec) in a call register. Here, st_sec is a count accumulated from a reference time in second units and st_msec is a count expressed in millisecond units, ranging from 0 to 999 milliseconds. If call initiation is unsuccessful, the service returns to normal operation in step 127.

In step 115, the ASP determines whether a service initiation signal has been received after a normal service set-up. A service is normally set up when a called party answers in response to the origination request or the termination request. Upon receipt of the service initiation signal, the procedure continues to step 117, in which the ASP stores the time when the call has been initiated as a service start time in seconds and milliseconds (st_sec and st_msec).

The ASP then implements a call service in step 119 and determines whether a service termination signal has been received in step 121. Upon receipt of the service termination signal, the procedure continues at step 123. If no service termination signal is received, the ASP again implements a call service in step 119.

In step 123, the ASP stores the time when the service termination signal has been received as a service end time end_sec and end_msec, and it sends billing data including the stored service start and end times to a billing processor in step 125, ending the procedure.

A disadvantage with the conventional billing method described above is that a subscriber is billed during a time period in which service is not provided to the subscriber due to a temporary service interruption or due to delayed signals being transmitted from the system to the subscriber. That is, a service charge is unfairly imposed during a "non-service time period", requiring the subscriber to pay excessive service charges.

SUMMARY OF THE INVENTION

Therefore it is an object of the present invention is to provide a billing method in which a subscriber is charged only for normally provided service.

Another object of the present invention is to provide a billing method in an electronic switch, for excluding a non-service time period from billing where the service is temporarily interrupted.

To achieve the above objects, a billing method in an electronic switch is provided, in which a call processor calculates a non-service time period and sends the non-service time period as billing data so that a billing processor can more accurately bill a subscriber for a normally provided service.

In accordance with an embodiment of the present invention, a billing method in an electronic switch in a cellular network generally comprises the steps of: setting a service start time defined as a time when a service initiation request or a service resumption request is generated; initiating a call; setting a service suspension request time as a service end time upon generation of a service suspension request during the service; suspending the service; billing data including the service start time and the service end time is sent during the service suspended state; determining whether a service resumption request is transmitted; and ending the service when a service termination request is transmitted during the service suspended state.

In accordance with another embodiment of the present invention, a service suspended period is calculated whenever a service suspension occurs during a service and then service suspended periods are accumulated. Billing data is constructed and the billing data is sent to a billing processor when the service ends. The billing data includes a final service suspended period, which is the accumulated value of the service suspended periods.

In accordance with a further embodiment of the present invention, a service suspended time period is calculated whenever a service suspension occurs during service and the service suspended time period is then stored according to a unique index. Then, billing data is constructed, including stored service suspended time periods and sent to a billing processor when the service ends.

In accordance with still another embodiment of the present invention, a call processor counts the number of service suspension occurrences during a service, constructs billing data including the count value, and sends the billing data to a billing processor. The billing processor then produces a total service suspended period by multiplying the number of service suspension occurrences by an average service suspended period, subtracts the total service suspended period from an overall service period, and bills a subscriber for the resulting normal service period.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
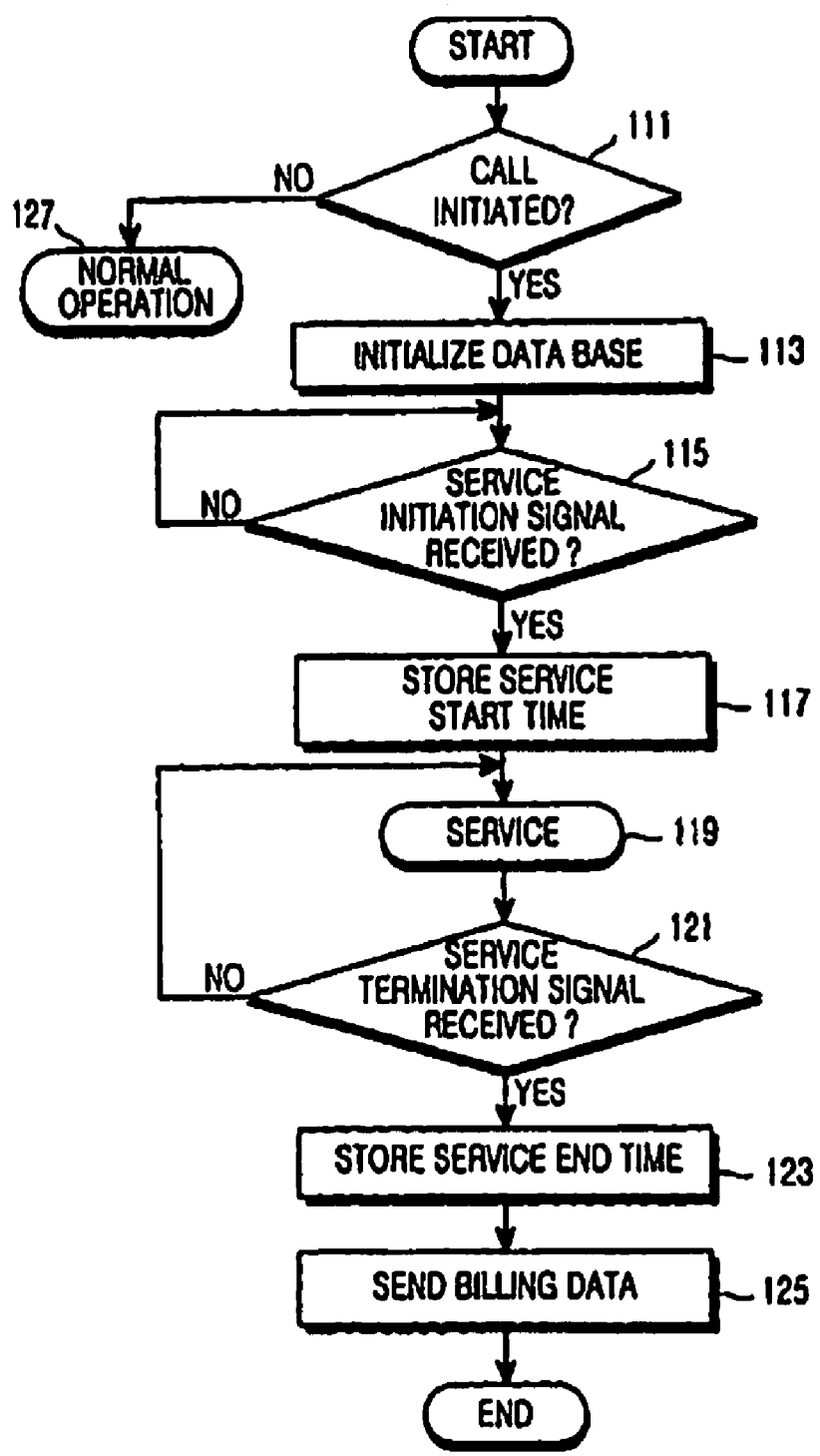
FIG. 1 is a flowchart illustrating a conventional billing procedure in an electronic switch.

Preferred embodiments of the present invention are described in detail below referring to the attached drawings in which like reference numerals denote the same components. It is to be noted that a detailed description of a known structure or function of the present invention will be omitted if it is deemed to obscure the subject matter of the present invention.

Figure 2:
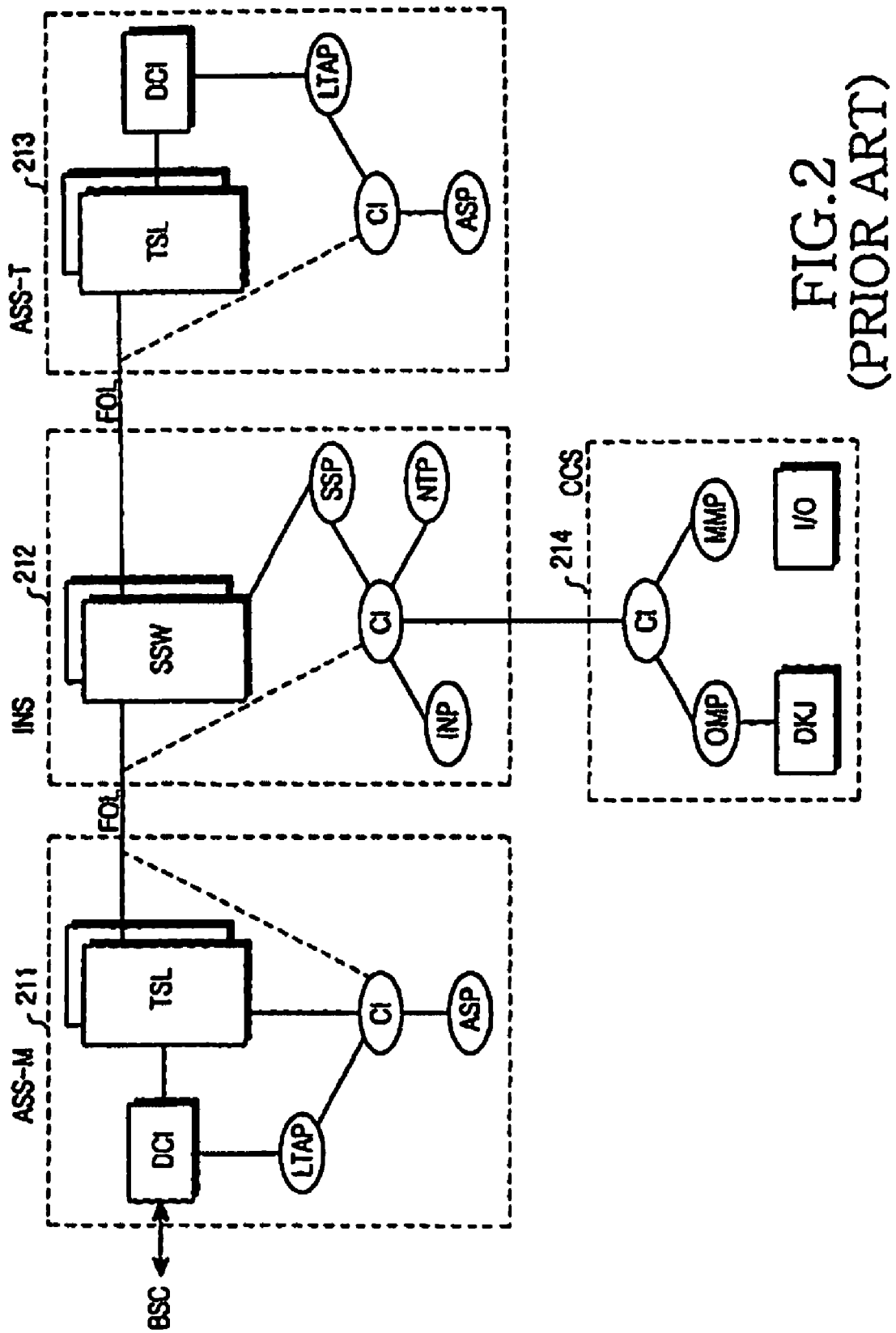
FIG. 2 is a block diagram illustrating a typical electronic switch in connection with a billing operation.

FIG. 2 is a block diagram of a typical electronic switch. Referring to FIG. 2, the electronic switch is comprised of an access switching subsystem-Mobile (ASS-M) 211, an access switching subsystem-trunk (ASS-T) 213, an interconnection network subsystem (INS) 212, and a connection control subsystem (CCS) 214.

Here, an electronic switch used in the present invention may be a fixed communication electronic switch but is preferably a mobile switching center (MSC). In the MSC, the ASS-M is connected to a base station controller (BSC) through wire.

Each function subsystem includes a main processor for providing overall control of the entire function subsystem and lower-layer devices, such as an access switching processor (ASP), an interconnection network processor (INP), a number translation processor (NTP), and an operating and maintenance processor (OMP) depending on its function.

A call is initiated by a digital control interface (DCI) in an ASS-M or ASS-T where a call is terminated. The DCI notifies the ASP of the call initiation and the ASP determines whether to provide a service based on system and resources status. If the call service is available, the ASP receives a necessary called number and entrusts number translation to the NTP of the INS 212. That is, a network path for connecting a call to a destination is determined from an analysis of the received subscriber number. Then, an internal speech path is connected between a TSL (Time Switch and Line) of an input terminal of the electronic switch and a TSL of an output terminal thereof by means of an SSW (Space Switch) in the INS 212. An originating office is linked to a terminated office according to characteristics of the selected path and call type, and a repose message, if a called subscriber responds, is processed. Then, the billing procedure starts.

Upon termination of the call, the ASP sends billing data to the OMP which is a billing processor according to the present invention. The OMP stores it on a magnetic tape or sends it to a CAMA, after temporary storage and processing of the billing data.

The OMP in the CCS 214 is responsible for system operation and management including billing and statistics. Each subsystem performs an interprocessor communication (IPC) with a central interface (CI) centered. IPC is performed through a fiber optic line (FOL) between the INS 212 and the ASS-M 211 and between the INS 212 and the ASS-T 213.

In accordance with the present invention, three different embodiments are suggested. In the first embodiment, billing data is generated until a service suspension start time is sent when a service suspension occurs and a billing procedure starts again when a service resumes. In the second embodiment, service suspension time periods are accumulated and the total of the service suspension time periods is sent as billing data when a service ends. In the third embodiment, a service suspension start time and a service suspension end time are stored in corresponding indexes at every occurrence of a service suspension, and stored service suspension start times and end times are sent as billing data.

Figure 3:
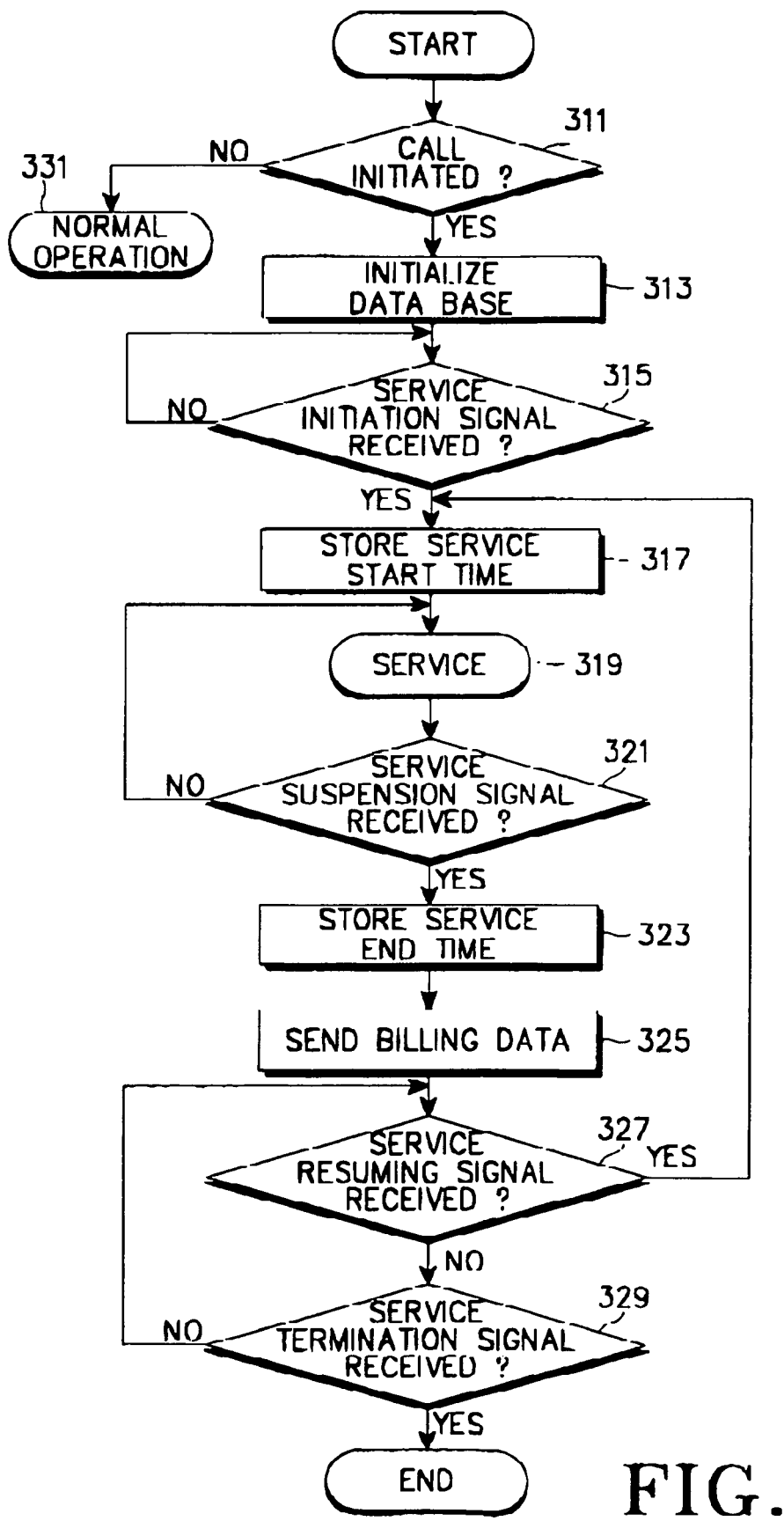
FIG. 3 is a flowchart illustrating a billing procedure in an electronic switch according to an embodiment of the present invention.

FIG. 3 is a flowchart illustrating a billing procedure utilizing the electronic switch at FIG. 2 in accordance with the first embodiment of the present invention. Referring to FIG. 3, the ASP determines whether a service has been initiated, that is, a call origination or termination has been attempted, in step 311. Upon call initiation, the procedure continues at step 313, the ASP initializes a data base, including the initialization of a service start time in seconds and milliseconds defined respectively as st_sec and st_msec. Here, st_sec is a count accumulated from a reference time in second units and st_msec is a count expressed in millisecond units, ranging from 0 to 999 milliseconds. If call initiation is unsuccessful, the service returns to normal operation in step 331.

The ASP then determines whether a service initiation signal has been received after a normal service set-up including reception of a response from a called subscriber in step 315. Upon receipt of the service initiation signal, the procedure continues at step 317, in which the ASP stores the time point when the call has been initiated as the service start time st_sec and st_msec.

The ASP then implements a call service in step 319 and determines whether a service suspension signal has been received in step 321. Upon receipt of the service suspension signal, the procedure continues at step 323. The service suspension signal is generated when a temporary service interruption occurs or a system notifies a subscriber of its status. That is, if frame errors occur during transmission or frames are not transmitted for a predetermined time, a BSC sends the service suspension signal to an MSC, notifying such a situation. If no service suspension signal is received, the ASP again implements a call service in step 319.

In step 323, the ASP stores the time point when it receives the service suspension signal as a service end time end_sec and end_msec, and in step 325 the ASP sends billing data including the stored service start and end times to a billing processor.

In step 327, the ASP determines whether service suspension has been released and a service resuming signal has been received. Upon receipt of the service resuming signal, the procedure continues at step 317 where the ASP stores the time when the service resuming signal was received as the service start time. When no service resuming signal is received, the procedure continues at step 329 where the ASP determines whether a service termination signal has been received. Upon receipt of a service termination signal, the procedure ends, however, if no service termination signal is received, the procedure returns to step 327 and awaits receipt of a service resuming signal. When a frame abnormality is released or normal frame transmission resumes, the BSC sends the service resuming signal to the MSC, notifying such a situation.

As described above, in the first embodiment, when service is suspended, billing data which was generated until the service suspension start time is sent and a charge begins accumulating again only when the service is resumed.

Billing data for use to implement the first embodiment is listed below.

TABLE 1

| item | size | remark |
| --- | --- | --- |
| [1] CDR type | 0.5 | calling CDR/called CDR/gateway exchange CDR |
| [2] CDR version | 0.5 | CDR version (1.0) |
| [3] CDR MSC ID | 3 | CDR generating switch ID |
| [4] CDR sequence NO. | 4 | CDR generation serial number |
| [5] caller MDN | 8 | calling number |
| [6] called MDN | 8 | called number |
| [7] caller ESN | 4 | calling ESN |
| [8] called ESN | 4 | called ESN |
| [9] global search ID | 7 | CDR connecting key for identical call |
| [10] billing class | 1 | no billing/calling billing/called billing |
| [11] input router | 2 | input route number |
| [12] output router | 2 | output route number |
| [13] call start time | 7 | call initiation year/mon/day/hr/min/sec . . . |
| [14] hard handoff counter | 1 | total number of handoffs |
| [15] call end time | 7 | call termination year/mon/day/hr/min/sec . . . |
| [16] additional service type | 1 | additional service type identified |
| [17] call initiating MSC ID | 3 | exchange at call initiation |
| [18] call initiating sector ID | 0.5 | sector number at call initiation |
| [19] call initiating FA | 0.5 | FA number at call initiation |
| [20] call terminating MSC ID | 3 | exchange at call termination |
| [21] call terminating sector ID | 0.5 | sector number at call termination |
| [22] call terminating FA | 0.5 | FA number at call termination |
| [23] call initiating cell ID | 2 | cell number at call initiation |
| [24] call terminating cell ID | 2 | cell number at call termination |
| [25] call initiating MSC ID of the other party | 3 | exchange of the other party at call initiation |
| [26] billing service | 1 | none/immediate billing/billing verification . . . |

The above (table 1) is used for a mobile switch.

Figure 4:
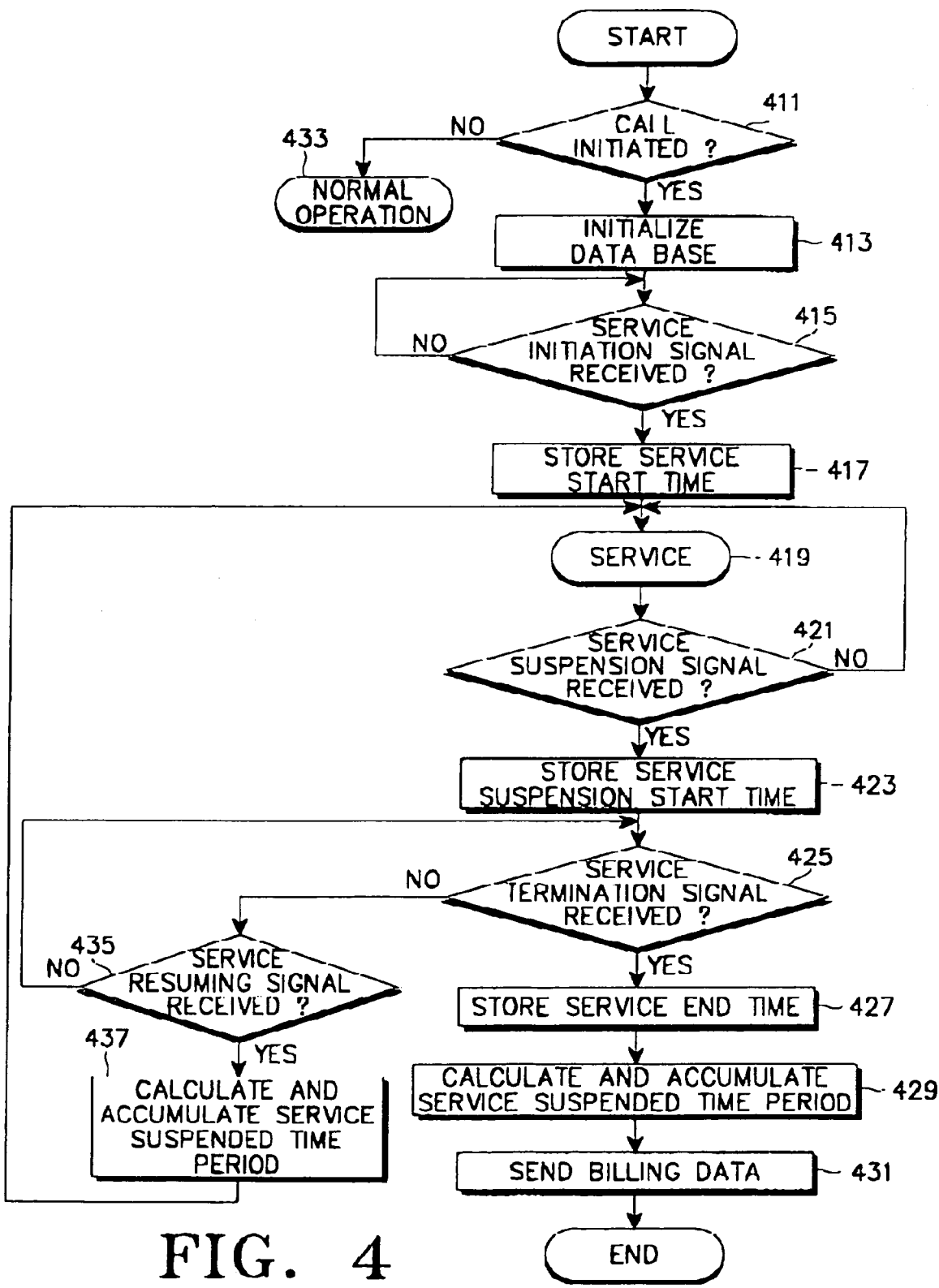
FIG. 4 is a flowchart illustrating a billing procedure in an electronic switch according to another embodiment of the present invention.

FIG. 4 is a flowchart illustrating a billing procedure in accordance with the second embodiment of the present invention. Referring to FIG. 4, the ASP determines whether call has been initiated, that is, a call origination or termination has been attempted, in step 411. Upon call initiation, the procedure continues at step 413, in which the ASP initializes a data base, such as initialization of a service start time st_sec and st_msec and an accumulated value nosvc_time of service suspended periods. Here, st_sec is a count accumulated from a reference time in second units and st_msec is a count expressed in millisecond units, ranging from 0 to 999 milliseconds. If call initiation is unsuccessful, the service returns to normal operation in step 331.

The ASP then determines whether a service initiation signal has been received after a normal service set-up including reception of a response from a called subscriber in step 415. Upon receipt of the service initiation signal, the procedure continues at step 417 in which the ASP stores the time when the call has been initiated as the service start time st_sec and st_msec.

The ASP then implements a call service in step 419 and determines whether a service suspension signal has been received in step 421. If no service suspension signal is received, the ASP again implements a call service in step 419. Upon receipt of the service suspension signal, the procedure continues at step 423 in which the ASP stores the time when the service suspension signal has been received as a service suspension start time nosvc_sec and nosvc_msec, and in step 425, it determines whether a service termination signal has been received. Upon receipt of the service termination signal, the procedure continues at step 427. If no termination signal is received in step 435 the ASP determines whether a service resuming signal has been received.

In step 427, the ASP stores the time when the service termination signal has been received as a service end time end_sec and end_msec, and in step 429, it calculates the service suspended time period, adds it to the previous service suspended time period, and produces the sum of service suspended time periods. More specifically, in step 429, the ASP stores the current time (the reception time of the service termination signal) as a service suspension end time tmp_sec and tmp_msec, calculates the difference between the service suspension start time nosvc_sec and nosvc_msec and the service suspension end time tmp_sec and tmp_msec, and then adds the resulting value to the previous accumulated value nosvc_time of service suspended time periods.

Upon receipt of the service resuming signal in step 435, the procedure continues at step 437, the service suspended time period nosvc_time is calculated by the ASP and added to the previous service suspended time period, thereby producing a final accumulated service suspended time period. More specifically, in step 437, the ASP stores the current time (the reception time of the service resuming signal) as a service suspension end time tmp_sec and tmp_msec, calculates the difference between the service suspension start time nosvc_sec and nosvc_msec and the service suspension end time tmp_sec and tmp_sec, and then adds the resulting value to the previous accumulated value nosvc_time of service suspended time periods. Then, the ASP returns to step 419 to perform the call service again. If the service resuming signal is not received in step 435, the ASP determines whether a service termination signal has been received, returning to step 425.

In accordance with the second embodiment of the present invention as described above, service suspended periods are accumulated.

The second embodiment requires the following billing data in addition to the billing data listed in Table 2.

TABLE 2

| item | size | remark |
| --- | --- | --- |
| [36] occupation time in non-service period | 4 | call time in non-service period |

Figure 5:
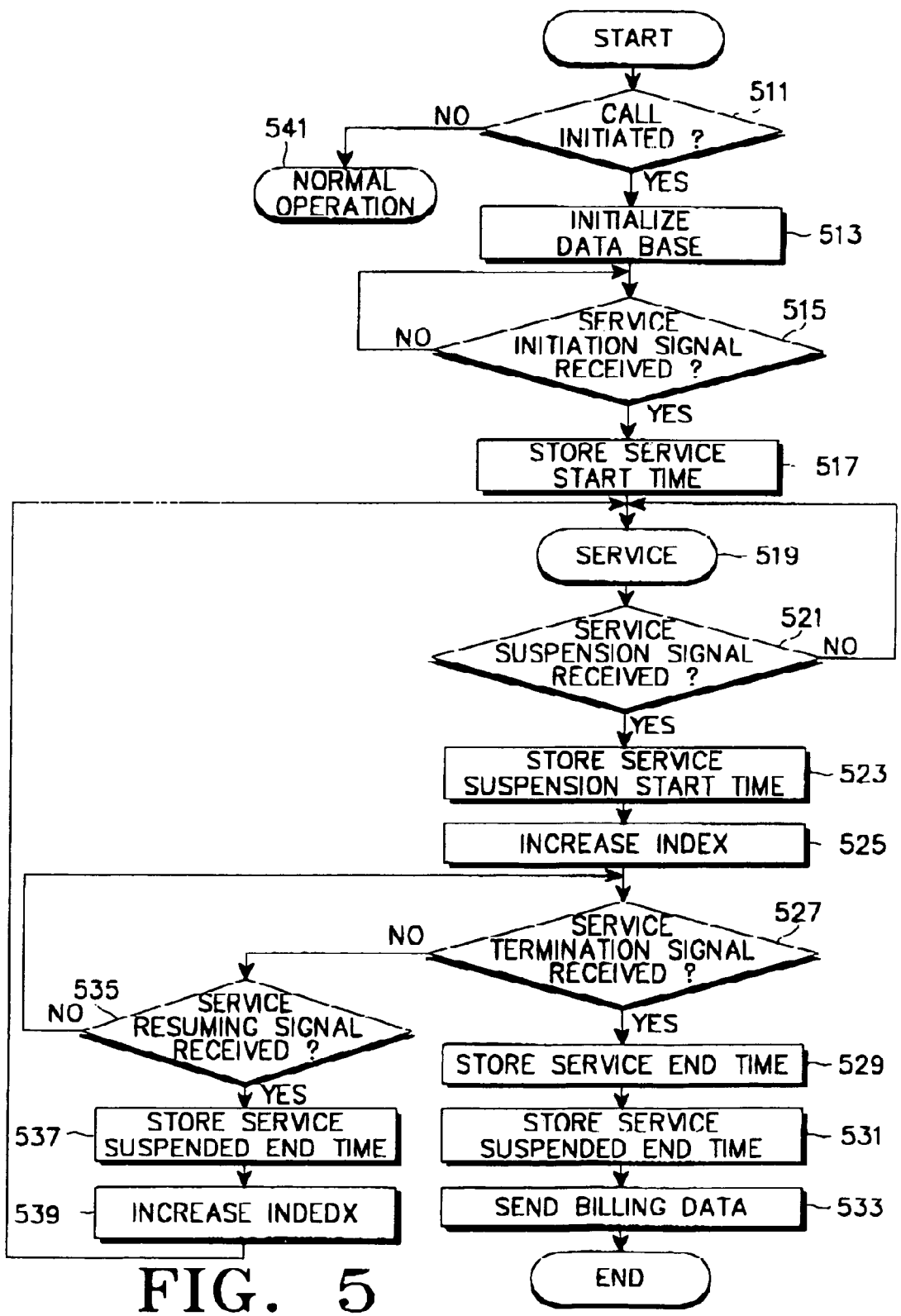
FIG. 5 is a flowchart illustrating a billing procedure in an electronic switch according to a further embodiment of the present invention.

FIG. 5 is a flowchart illustrating a billing procedure in accordance with the third embodiment of the present invention. Referring to FIG. 5, the ASP determines whether a call has been initiated, that is, a call origination or termination has been attempted, in step 511. Upon call initiation, the procedure continues at step 513 in which the ASP initializes a data base such as initialization of a service start time st_sec and st_msec and a service suspension time array value nosvc_sec []and nosvc_msec []. Here, st_sec is a count accumulated from a reference time in second units and st_msec is a count expressed in millisecond units, ranging from 0 to 999 milliseconds.

The ASP then determines whether a service initiation signal has been received after a normal service set-up including reception of a response from a called subscriber in step 515. Upon receipt of the service initiation signal, the procedure continues at step 517, in which the ASP stores the time point when the call has been initiated as a service start time st_sec and st_msec.

The ASP then implements a call service in step 519 and determines whether a service suspension signal has been received in step 521. If no service suspension signal is received, the ASP again implements a call service in step 519. Upon receipt of the service suspension signal, the procedure continues at step 523, in which the ASP stores the current time when the service suspension signal has been received in a service suspension time array nosvc_sec [index] and nosvc_msec [index] indicated by a corresponding index and increments the index in step 525.

The ASP determines whether a service termination signal has been received in step 527. Upon receipt of the service termination signal, the procedure continues at step 529. If no service termination signal is received, in step 535 the ASP determines whether a service resuming signal has been received.

In step 529, the ASP stores the time when the service termination signal has been received as a service end time end_sec and end_msec, and in step 531, it stores the service suspension end time in a service suspension time array nosvc_sec [index+1] and nosvc_msec [index+1] by the index. In step 533, the ASP sends billing data including the stored service start time, the service end time, the service suspension start time, and the service suspension end time to the billing processor and ends the program.

Upon receipt of the service resuming signal in step 535, the procedure continues at step 537, in which the service suspension end time is stored in an array indicated by a corresponding index, and in step 539, the ASP increments the index. Then, the ASP returns to step 519 to perform the call service again. If the service resuming signal is not received in step 535, the ASP determines whether a service termination signal has been received in returning to step 527.

In accordance with the third embodiment of the present invention, the service suspension start time and end time are recorded whenever a service is suspended and a service suspension is released, and billing data including the service suspension start time and the service suspension end time is produced.

In addition to the billing data listed in (table 1), extra billing data required for the third embodiment is given in (table 3).

TABLE 3

| item | size | remarks |
|---|---|---|
| [36] number of non-services | 1 | number of non-service occurrences |
| [37] non-service start time 1 | 7 | non-service initiation year/mon/day/hr/min/sec |
| [38] non-service end time 1 | 7 | non-service termination year/mon/day/hr/min/sec |
| [37] non-service start time 2 | 7 | non-service initiation year/mon/day/hr/min/sec |

TABLE 3-continued

| item | size | remarks |
|---|---|---|
| [38] non-service end time 2 | 7 | non-service termination year/mon/day/hr/min/sec |
| [37] non-service start time 3 | 7 | non-service initiation year/mon/day/hr/min/sec |
| [38] non-service end time 3 | 7 | non-service termination year/mon/day/hr/min/sec |
| [37] non-service start time 4 | 7 | non-service initiation year/mon/day/hr/min/sec |
| [38] non-service end time 4 | 7 | non-service termination year/mon/day/hr/min/sec |
| [37] non-service start time . . . | 7 | non-service initiation year/mon/day/hr/min/sec |
| [38] non-service end time . . . | 7 | non-service termination year/mon/day/hr/min/sec |
| [37] non-service start time n | 7 | non-service initiation year/mon/day/hr/min/sec |
| [38] non-service end time n | 7 | non-service termination year/mon/day/hr/min/sec |

Figure 6A:
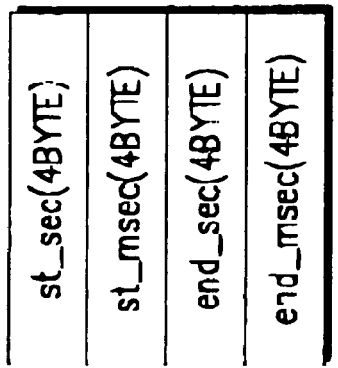
FIGS. 6A, 6B, and 6C illustrate data used in billing according to the present invention.
Figure 6B:
Figure 6B:
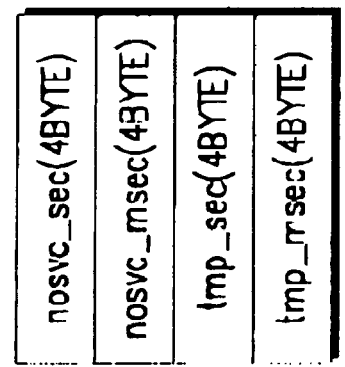
Figure 6B:
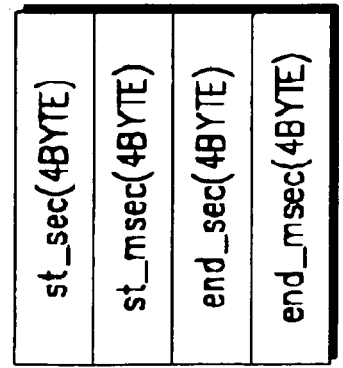
Figure 6C:
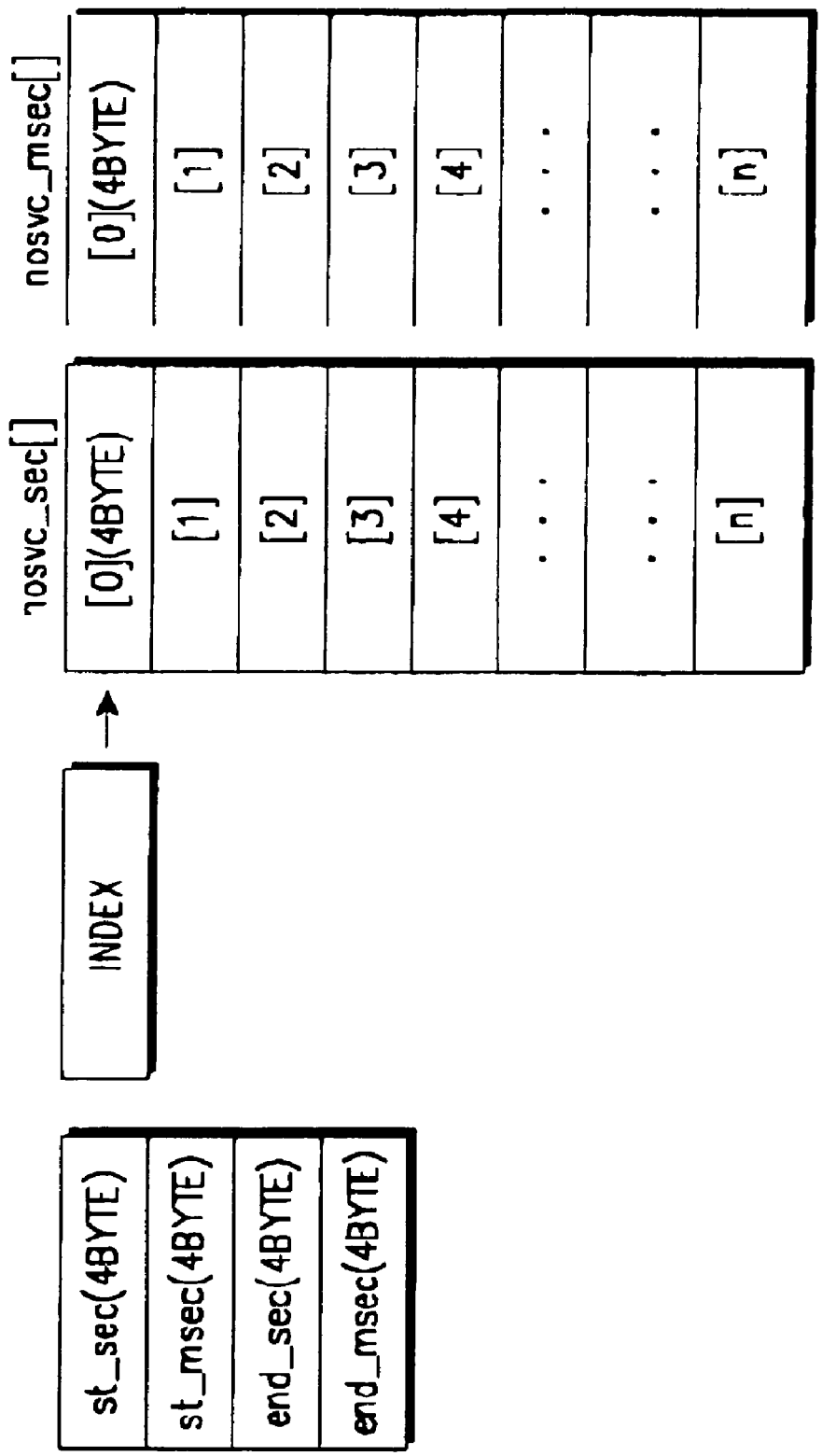

FIGS. 6A, 6B, and 6C illustrate data used in the first to third embodiments of the present invention, respectively.

As shown in FIG. 6A, the data for the first embodiment includes a service start time st_sec (4 bytes) and st_msec (4 bytes) and a service end time end_sec (4 bytes) and end_msec (4 bytes). In the first embodiment, a service suspension start time and a service suspension end time are recorded whenever a temporary service suspension occurs, and billing data is immediately generated. Therefore, a plurality of billing tickets should be issued for a call service.

As shown in FIG. 6B, the data for the second embodiment includes a service suspension start time nosvc_sec (4 bytes) and nosvc_msec (4 bytes), a service suspension end time tmp_sec (4 bytes) and tmp_msec (4 bytes), and an accumulated value nosvc_time (4 bytes) of service suspended periods, in addition to the data used in the first embodiment. In the second embodiment, a service suspension start time is stored when a service suspension occurs, a service suspended period is calculated when the service suspension is released, and the resulting value is added to the current service suspended period value to thereby update the service suspended time period value.

As shown in FIG. 6C, the data for the third embodiment includes indexes indicating a service suspension start time and a service suspension end time and the data storing arrays nosvc_sec [](4 bytes) and nosvc_msec [](4 bytes), in addition to the data used in the first embodiment. In the third embodiment, the index is set to 0 at a data initialization, and the pointer indicates the first area in the array. When a temporary service suspension occurs, its occurrence time is stored in the first area and the index is incremented by 1 so that the pointer indicates the second area in the array. Then, when the service suspension is released, its time is stored in the second area of the array. In this manner, the service suspension start time and suspension end time are sequentially stored. Then, upon call termination, billing data including a plurality of service suspension start times and end times is sent to the billing processor.

A fourth embodiment may be defined from the third embodiment by offering only the number of service suspension occurrences. That is, service suspension occurrences during a service are counted, and billing data including the occurrence number is sent to the billing processor. Then, the billing processor calculates the total service suspended time period by multiplying the number of service suspension occurrences by an average service suspended period, and subtracts the total service suspended period from a total service period, for billing a subscriber. Here, an average of service suspended periods generally involved in an electronic switch can be used as the above average service suspended period.

In accordance with the present invention as described above, the time period when service is not provided to a subscriber due to a temporary service interruption or signals issued from a system can be excluded from billing for the service in an electronic switch. Therefore, the service is more reasonably charged and disagreements between the subscriber and a service provider on service charges can be reduced.

While the present invention has been described in detail with reference to the specific embodiments herein, they are mere exemplary applications. Thus, it is to be clearly understood that many variations can be made by anyone skilled in the art within the scope and spirit of the present invention.

What is claimed is:

1. A method of billing service in an electronic switch in a cellular network system, comprising the steps of:
    setting a time when a service initiation request or a service resumption request is generated as a service start time and initiating a call;
    setting a service suspension request time as a service end time upon generation of a service suspension request by the system during the service and suspending the service;
    sending billing data including the service start time and the service end time in the service suspended state, and determining whether a service resumption request is generated; and
    ending the service when a service termination request is generated in the service suspended state.

2. The billing method of claim 1, wherein the service initiation request is generated when an outgoing call is answered.

3. The billing method of claim 1, wherein the service initiation request is generated when an incoming call is answered.

4. The billing method of claim 1, wherein the service suspension signal is sent by a BSC to notify that frames are not normally transmitted.

5. The billing method of claim 1, wherein the service resuming signal is sent by the BSC to notify that a frame transmission resumes.

6. A method of billing service in an electronic switch in a cellular network system comprising the steps of:
    calculating a service suspended period whenever a service suspension occurs during a service and accumulating service suspended periods; and
    constructing billing data, including a final service suspended period being the accumulated value of service suspended periods and sending the billing data to a billing processor, when the service ends, wherein service suspension periods are interruptions of service by the system, and determining whether a service resumption request is generated.

7. The billing method of claim 6, wherein the service suspended period is the difference between a service suspension start time and a service resuming time.

8. The billing method of claim 6, wherein the service suspended period is the difference between a service suspension start time and a service end time.

9. A method of billing service in an electronic switch in a cellular network system, comprising the steps of:
    calculating a service suspended period whenever a service suspension occurs during a service and storing the service suspended period according to a unique index; and
    constructing billing data including stored service suspended periods and sending the billing data to a billing processor, when the service ends,
    wherein service suspension periods are interruptions of service by the system.

10. The billing method of claim 9, wherein the service suspended period is the difference between a service suspension start time and a service suspension end time, wherein the service suspension end time is a service resuming time.

11. The billing method of claim 10, wherein the service suspension end time is a service end time.

12. The billing method of claim 11, wherein the service suspension start time and the service suspension end time are stored according to different indexes.

13. The billing method of claim 9, wherein the billing data further includes the number of service suspension occurrences.

14. A method of billing service in an electronic switch in a cellular network system, comprising the steps of:
    setting a service initiation request time upon request for call initiation and initiating a call;
    setting a service suspension request time as a service suspension start time upon request for service suspension and suspending the service;
    setting a service resumption request time as a service suspension end time upon request for service resumption in the service suspended state, calculating a service suspended time from the service suspension start time and the service suspension end time, adding the calculated service suspended period to a previous service suspended period, and resuming the service;
    setting a service termination request time as a service end time upon request for service termination in the service suspended state, calculating a service suspended time from the service suspension start time and the service end time, adding the calculated service suspended period to a previous service suspended period, and resuming the service; and
    sending billing data including the service start time, the service end time and a final accumulated service suspended time to a billing processor, and ending the service,
    wherein service suspension periods are interruptions of service by the system.

15. The billing method of claim 14, wherein the service suspension signal is sent by a BSC to notify that frames are not normally transmitted.

16. The billing method of claim 14, wherein the service resuming signal is sent by the BSC to notify that a frame transmission resumes.

17. The billing method of claim 14, wherein the service suspended period is the difference between the service suspension start time and the service suspension end time.

18. The billing method of claim 17, wherein the service suspended period is the difference between a service suspension start time and the service end time.

19. A method of billing service in an electronic switch in a cellular network system, comprising the steps of:
    designating a unique index upon request for service suspension during a service, setting a service suspension request time as a service suspension start time according to the unique index, and suspending the service;

designating a unique index upon request for service resumption in the service suspended state, setting a service resumption request time as a service suspension end time according to the unique index, and resuming the service;

designating a unique index upon request for service termination in the service suspended state, and setting a service termination request time as a service suspension end time according to the unique index; and constructing billing data including the service suspension start time and the service suspension end time, sending the billing data to a billing processor, and ending the service, wherein the service suspended state is an interruption of service by the system.

20. The billing method of claim 19, wherein the billing data further includes the number of service suspension occurrences.

21. A billing method in an electronic switch in a cellular network system, comprising the steps of:

counting the number of service suspension occurrences generated during a service, constructing billing data including the count value, and sending the billing data to a billing processor, via a call processor; and producing a total service suspended period by multiplying the number of service suspension occurrences by an average service suspended period, subtracting the total service suspended period from an overall service period, and billing a subscriber for a resulting normal service period, wherein service suspension occurrences are interruptions of service by the system.

22. A billing method in an electronic switch in a cellular network system, comprising the steps of:

calculating a service suspended period during a service in progress; and billing a subscriber for a normal service period resulting from subtracting the calculated service time period from an overall service period, wherein the service suspended period is an interruption of service by the system, and determining whether a service resumption request is generated.

23. The billing method of claim 22, wherein the service suspended period is the difference between a service suspension request time and a service resuming request time during a service in progress.

24. The billing method of claim 23, wherein the overall service period is the difference between a service initiation request time and a service termination request time.

* * * * *